US United States Patent Office 3,794,614
Patented Feb. 26, 1974

3,794,614
FLAME RETARDANT PROPYLENE POLYMERS
John Versnel, Plainsboro, N.J., assignor to Cities Service Company, New York, N.Y.
No Drawing. Continuation-in-part of abandoned application Ser. No. 175,781, Aug. 20, 1971. This application Nov. 29, 1972, Ser. No. 310,516
Int. Cl. C08f 45/58, 45/62
U.S. Cl. 260—45.75 B                    10 Claims

ABSTRACT OF THE DISCLOSURE

A phosphite synergist is used to enhance the flame retardency of a polypropylene composition containing a flame retardant which has the structure of a brominated 1:1 Diels-Alder adduct of a polyhalocyclopentadiene and a polyunsaturated compound. The synergist is an organic phosphite containing not more than one aromatic radical per phosphorus atom, e.g., distearyl pentaerythritol diphosphite. When desired for further enhancement of flame retardancy, a metal oxide or other metal compound may also be incorporated.

CROSS-REFERENCE TO RELATED APPLICATION

This application is a continuation-in-part of copending application Ser. No. 175,781, filed Aug. 20, 1971, now abandoned.

BACKGROUND OF THE INVENTION

Field of the invention

This invention relates to self-extinguishing polypropylene compositions and more particularly relates to such compositions containing a halogenated flame retardant and a phosphite synergist.

Description of the prior art

It is known that polypropylene may be rendered self-extinguishing by the incorporation of a halogenated flame retardant. As disclosed in now abandoned U.S. application Ser. No. 115,081, filed Feb. 12, 1971, in the name of Jack Nowcombe, particularly good results are obtained when the halogenated flame retardant has the structure of a polybrominated 1:1 Diels-Alder adduct of a polyhalocyclopentadiene and a polyunsaturated aliphatic or cycloaliphatic hydrocarbon containing at least four carbon atoms. The effectiveness of such a flame retardant may be increased by the incorporation of antimony trioxide or the like as a synergist. However, since these conventional synergists, like the brominated compounds, may have a deleterious effect on polymer properties, it would obviously be desirable to find another type of material capable of synergizing with the brominated Diels-Alder adducts.

SUMMARY OF THE INVENTION

An object of this invention is to enhance the flame retardancy of a polypropylene composition containing a flame retardant which has the structure of a brominated 1:1 Diels-Alder adduct of a polyhalocyclopentadiene and a polyunsaturated compound.

Another object is to provide such an enhancement of flame retardancy with a novel synergist.

These and other objects are attained by blending polypropylene and the flame retardant with at least about 1%, based on the weight of the flame retardant, of an organic phosphite synergist containing not more than one aromatic radical per phosphorus atom.

DESCRIPTION OF THE PREFERRED EMBODIMENTS

The self-extinguishing polypropylene compositions which are improved in accordance with the invention are those wherein the flame retardant has the structure of a polybrominated 1:1 Diels-Alder adduct of a polyhalocyclopentadiene and a polyunsaturated aliphatic or cycloaliphatic hydrocarbon containing at least four, usually 4–20, carbon atoms. Thus, the flame retardant corresponds to the formula:

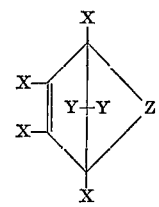

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms. When Y is alkyl or alkoxy, it usually contains 1–16, preferably 1–5, carbon atoms. The preferred flame retardants are those in which X is chloro, Y is chloro, bromo, or fluoro, and Z is a polybromo cycloaliphatic hydrocarbon radical containing 5–16 carbon atoms and 2–6 bromo substituents. Most preferably, Z is a polybromo cycloalkyl radical. A particularly preferred flame retardant is 5,6-dibromo-1,10,11,12,13,13-hexachlorotricyclo[8.2.1.0$^{2,9}$] tridecene-11, i.e., the dibrominated 1:1 Diels-Alder adduct of hexachlorocyclopentadiene and cyclooctadiene-1,5.

Although the flame retardants may be prepared by forming a Diels-Alder adduct of a polyhalocyclopentadiene and an unsaturated aliphatic or cycloaliphatic bromide, they are usually prepared by first forming a Diels-Alder adduct of a polyhalocyclopentadiene and a polyunsaturated aliphatic or cycloaliphatic hydrocarbon and then brominating the product thus formed.

Polyhalocyclopentadienes suitable for use in preparing the adducts include, for example, hexachlorocyclopentadiene,
hexabromocyclopentadiene,
5,5-dimethoxytetrachlorocyclopentadiene,
5,5-diethoxytetrachlorocyclopentadiene,
5,5-dimethyltetrachlorocyclopentadiene,
5,5-difluorotetrachlorocyclopentadiene,
5,5-dibromotetrachlorocyclopentadiene, etc.

Exemplary of the unsaturated compounds which may be reacted with the polyhalocyclopentadienes are butadiene,
isoprene,
hexadiene-1,4,
hexatriene-1,3,5,
octadiene-1,7,
octatriene-1,3,7,
3-methylhepatriene-1,4,6,
decadiene-1,9,
decatrieno-1,4,9,
1-phenyldecatriene-1,4,9,
divinylbenzene,
liquid polybutadiene,
cyclopentadiene,
bicycloheptadiene,
4-vinylcyclohexene, cyclooctadiene-1,3,
cyclooctadiene-1,5,
trivinylcyclohexane,
cyclododecatriene-1,5,9,
bis(cyclohexenyl)ethylene,
trimethylcyclododecatriene-1,5,9,
cyclohexadecatetraene-1,5,9,13, etc.

The flame retardants of the invention may be brominated 1:1 adducts of any of the aforementioned polyhalocyclopentadienes with any of the aforementioned unsaturated compounds, or they may be brominated 1:1 adducts of equivalent reactants. The compositions of the invention usually contain about 0.5–20%, preferably about 4–16%, of the flame retardant, based on the weight of polypropylene.

The phosphite employed in accordance with the invention may be any organic phosphite containing not more than one aromatic radical per phosphorus atom, e.g., a phosphite corresponding to the formula

in which Q is oxygen or sulfur, R and R' are aliphatic or cycloaliphatic hydrocarbyl radicals, and R" is an aliphatic, cycloaliphatic, or aromatic hydrocarbyl radical. Such phosphites include, for example, trimethyl phosphite, trihexyl trithiophosphite, diisodecyl phenyl phosphite, poly(bisphenol A pentaerythritol diphosphite) having a D.P. of 2–3, other polymeric phosphites containing the recurring unit:

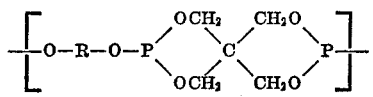

wherein R is a hydrocarbyl or hydrocarbyloxy radical containing 1–20 carbon atoms, etc. However, the preferred phosphites are trialkyl phosphites and thiophosphites wherein the alkyl groups contain 10–20 carbon atoms (e.g., tridecyl phosphite, trilauryl trithiophosphite, tricetyl trithiophosphite, tristearyl phosphite, etc.), phosphites corresponding to the formula:

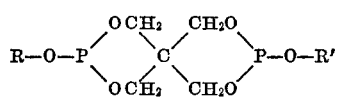

wherein R and R' are hydrocarbyl radicals containing 1–20 carbon atoms (e.g., distearyl pentaerythritol diphosphite, dicetyl pentaerythritol diphosphite, ditetradecyl pentaerythritol diphosphite, diisodecyl pentaerythritol diphosphite, dibutyl pentaerythritol diphosphite, methyl stearyl pentaerythritol diphosphite, etc.), and phosphites corresponding to the formula:

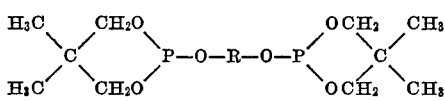

wherein R is a hydrocarbyl or hydrocarbyloxy radical containing 1–20 carbon atoms (e.g., bis(neopentyl glycol) 1,4 - cyclohexanedimethylene diphosphite, bis(neopentyl glycol) triethyleneglycol diphosphite, bis(neopentyl glycol) methylene diphosphite, etc.).

Generally the phosphites contain 1–6 phosphorus atoms and 6–60 carbon atoms per phosphorus atom. The phosphite may not contain more than one aromatic radical per phosphorus atom because such phosphites, e.g., triphenyl phosphite, are inoperative in the practice of the invention.

The compositions of the invention usually contain about 3–100% of the phosphite, based on the weight of the flame retardant. When the phosphite is the sole synergist, its concentration is advantageously about 40–80% by weight, while a concentration of about 3–30% by weight is frequently desirable when the composition contains an additional synergist.

When the presence of at least some metal compound in the compositions is tolerable, it is often advantageous for the compositions of the invention to contain about 20–100%, preferably about 40–60%, of a conventional metal compound synergist, based on the weight of the flame retardant. These metal compound synergists, of course, are well known. They may be organometallic compounds but are usually oxides or sulfides of a polyvalent metal such as antimony, arsenic, bismuth, tin, or titanium. Of these metal compounds utilizable as additional synergist in the compositions of the invention, antimony trioxide is preferred.

Although the compositions of the invention may be prepared by any suitable technique, they are usually prepared by mixing the additive or additives with molten polypropylene to provide an intimate admixture.

The use of the organic phosphite in the compositions of the invention enhances the flame retardancy of the compositions and thus makes it possible to eliminate or reduce the amount of metal compound synergist usually employed in such compositions to obtain an optimum level of flame retardancy.

The following examples are given to illustrate the invention and are not intended as a limitation thereof. Unless otherwise specified, parts mentioned are parts by weight.

EXAMPLE I

Part A—Control

Blend 100 parts of polypropylene with 25 parts of distearyl pentaerythritol diphosphite on a two-roll mill. The composition has an oxygen index of 19.8.

Part B—Control

Blend 100 parts of polypropylene with 5.3 parts of the dibrominated 1:1 Diels-Alder adduct of hexachlorocyclopentadiene and cyclooctadiene-1,5 on a two-roll mill. The composition has an oxygen index of 20.7.

Part C—Control

Repeat Part B except for using 25 parts of the Diels-Alder adduct. The composition has an oxygen index of 21.5.

Part D

Repeat Part B except for using 6.4 parts of the Diels-Alder adduct and also blending the polymer with 3.2 parts of distearyl pentaerythritol diphosphite. The composition has an oxygen index of 23.8.

EXAMPLE II

Part A—Control

Blend 100 parts of polypropylene with 5.4 parts of the Diels-Alder adduct of Example I and 2.7 parts of antimony trioxide. The composition has an oxygen index of 25.8.

Part B

Prepare three compositions by repeating Part A except for also blending the polymer with, respectively, 0.3, 0.5, and 1.1 parts of distearyl pentaerythritol diphosphite. The compositions have respective oxygen indices of 26.2, 26.9, and 27.8.

Part C

Prepare three compositions by repeating Part A except for also blending the polymer with 1.1 parts of (a) tristearyl phosphite, (b) trilauryl trithiophosphite, and (c) diisodecyl pentaerythritol diphosphite, respectively. Each of the compositions has an oxygen index of 27.8.

EXAMPLE III

Part A—Control

Blend 100 parts of polypropylene with 5.4 parts of the Diels-Alder adduct of Example I. The composition has an oxygen index of 20.7 and UL-94 rating of burning.

Part B—Control

Repeat Part A except for also blending the polymer with 2.7 parts of triphenyl phosphite. The blend has an oxygen index of 23.4 and UL-94 rating of burning.

Part C

Repeat Part A except for also blending the polymer with 2.7 parts of phenyl diisodecyl phosphite. The composition has an oxygen index of 24.3 and a UL-94 rating of SE-2.

Similar results are observed when the other Diels-Alder adducts described in the specification are used as the flame retardants.

It is obvious that many variations may be made in the products and processes set forth above without departing from the spirit and scope of this invention.

What is claimed is:
1. A composition comprising:
   (A) polypropylene,
   (B) a halogenated flame retardant corresponding to the formula:

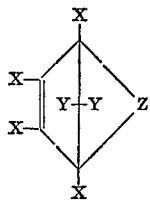

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms, and
   (C) at least about 1%, based on the weight of the flame retardant, of an organic phosphite synergist containing 1–6 phosphoros atoms, 6–60 carbon atoms per phosphorus atom, and not more than one aromatic radical per phosphorus atom; said phosphite being selected from the group consisting of:
   (1) a phosphite corresponding to the formula $$P(QR)(QR')(QR'')$$

in which Q is oxygen or sulfur, R and R' are aliphatic or cycloaliphatic hydrocarbyl radicals, and R'' is an aliphatic, cycloaliphatic, or aromatic hydrocarbyl radical,
   (2) a phosphite corresponding to the formula:

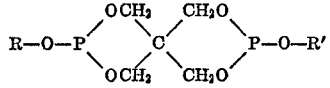

in which R and R' are hydrocarbyl radicals containing 1–20 carbon atoms, and
   (3) a phosphite corresponding to the formula:

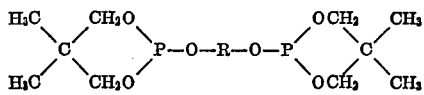

in which R is a hydrocarbyl or hydrocarbyloxy radical containing 1–20 carbon atoms.
2. The composition of claim 1 wherein Y is chloro, bromo, or fluoro and Z is a polybromo cycloaliphatic hydrocarbon radical containing 5–16 carbon atoms and 2–6 bromo substituents.
3. The composition of claim 2 wherein the flame retardant corresponds to the formula:

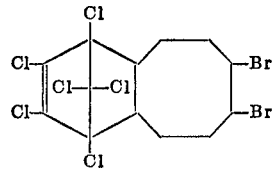

4. The composition of claim 1 wherein the synergist is a phosphite corresponding to the formula $$P(QR)(QR')(QR'')$$

in which Q is oxygen or sulfur, R and R' are aliphatic or cycloaliphatic hydrocarbyl radicals, and R'' is an aliphatic, cycloaliphatic, or aromatic hydrocarbyl radical.
5. The composition of claim 4 wherein the synergist is a trialkyl phosphite or thiophosphite in which the alkyl group contains 10–20 carbon atoms.
6. The composition of claim 1 wherein the synergist is a phosphite corresponding to the formula:

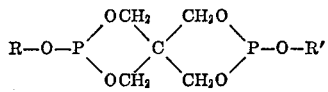

in which R and R' are hydrocarbyl radicals containing 1–20 carbon atoms.
7. The composition of claim 6 wherein the synergist is distearyl pentaerythritol diphosphite, dicetyl pentaerythritol diphosphite, ditetradecyl pentaerythritol diphosphite, or diisodecyl pentaerythritol diphosphite.
8. The composition of claim 1 wherein the synergist is a phosphite corresponding to the formula:

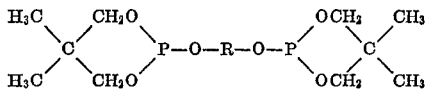

in which R is a hydrocarbyl or hydrocarbyloxy radical containing 1–20 carbon atoms.
9. The composition of claim 8 wherein the synergist is bis(neopentyl glycol) 1,4 - cyclohexanedimethylene diphosphite or bis(neopentyl glycol) triethyleneglycol diphosphite.
10. The composition of claim 1 containing an oxide or sulfide of antimony, arsenic, bismuth, tin, or titanium as an additional synergist.

References Cited

UNITED STATES PATENTS

| | | | |
|---|---|---|---|
| 3,047,608 | 7/1962 | Friedman et al. | 260—927 |
| 3,403,036 | 9/1968 | Hindersinn et al. | 260—45.75 |
| 3,313,857 | 4/1967 | Gelfard | 260—648 |
| 3,098,599 | 6/1963 | Tamm et al. | 260—45.7 |
| 3,025,329 | 3/1962 | Gleason | 260—648 |
| 3,519,597 | 7/1970 | Weil et al. | 260—45.75 |
| 2,912,356 | 11/1959 | Schmerling | 260—648 |
| 3,050,567 | 8/1962 | Schmerling | 260—648 |
| 2,955,141 | 10/1960 | Schmerling | 260—648 |
| 2,952,711 | 9/1960 | Roberts | 260—648 |
| 2,900,377 | 8/1959 | Fields | 252—46.6 |
| 3,365,505 | 1/1968 | Norell | 260—648 |
| 3,697,607 | 10/1972 | Cardenas et al. | 260—648 |

DONALD E. CZAJA, Primary Examiner

V. P. HOKE, Assistant Examiner

U.S. Cl. X.R.

260—45.7 P, 45.7 R, 45.8 R